March 25, 1952     A. HÖRGÅRD     2,590,249
FISHING NET ATTACHMENT
Filed Oct. 8, 1946
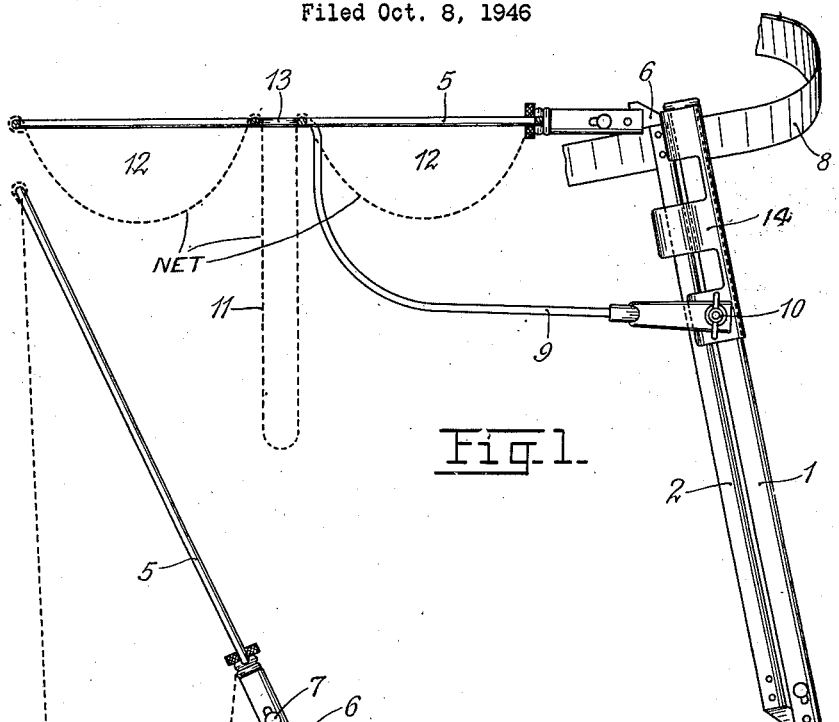
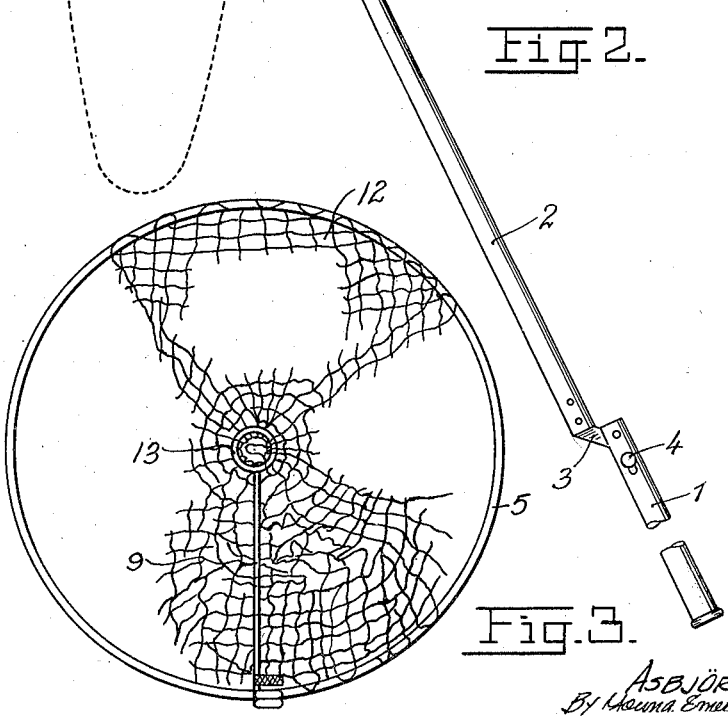
INVENTOR
ASBJÖRN HÖRGÅRD Patented Mar. 25, 1952

2,590,249

UNITED STATES PATENT OFFICE 2,590,249

FISHING NET ATTACHMENT

Asbjörn Hörgård, Drontheim, Norway

Application October 8, 1946, Serial No. 702,005
In Norway October 16, 1945

1 Claim. (Cl. 43—4)

The present invention relates to improvement in fishing appliances. Especially this invention relates to improvement in means for supporting and coiling the loose bight of the line when fishing with flies, and in this connection especially when fishing with dry flies.

When a fisherman is fishing with dry flies his object is to cast or shoot the fly as far out as possible. The line to which the fly is attached is coiled on a reel and the resistance of the reel will be too large to obtain a good result.

For this reason the fisherman while he is making himself ready to shoot the fly, pulls out a certain length of the line from the reel which bight shall be ready to run out with the fly when cast. This bight is commonly called the loose bight by the fisherman.

The prime object of this invention is to provide a suitable holder adapted to hold this loose bight in such a way that it may run out without any unnecessary resistance.

For this purpose the invention consists in a tray or an annular trough adapted to be attached to a belt or in other way attached to the person during fishing in a horizontal position extending out from the fisherman. This tray is according to the invention preferably arranged in a bowl shape having the central part of the bottom raised in such a way, that a ring-shaped basket like gutter is formed around the center part. In this ring-shaped basket like gutter the loose bight is coiled and from there the loose bight easily may run out when the fly is shot.

The invention also comprises means in connection with a landing net which means makes it possible to use the landing net for a second purpose, namely to use the landing net for the coiling of the loose bight whereby no special means has to be carried along for this purpose.

In order to use a landing net for this purpose it is necessary to make a special construction of the landing net or at least of the handle for the landing net, so that it easily may be attached to a specially constructed holder, which again may be attached to the belt, and furthermore so that the landing net easily may be released from this holder and be made adapted for landing the fish when this is to be done.

A further object of this invention is therefore to provide a special arrangement in connection with a landing net to make it adapted for this purpose.

The invention further has for its object to construct a holder or clamping means adapted to clamp the handle of the landing net to the belt and provide it with a special arm having an arm in its free end and swingably attached to the holder in such a way, that the arm may be positioned in the center of the landing net ring and be adapted to receive the surplus of the landing net proper, when the landing net is to be used as supporting means for the loose bight.

For the purpose of the above mentioned objects the landing net according to the invention comprises a handle which is made out of two parts hingedly connected together and provided with automatic locking means which will lock the handles together in an outfolded position and further frame means swingably attached to one end of the handle section and adapted to be locked in different positions, one position in substantially normal angle to the handle, in which position it may be attached to the belt and be used as means for supporting the loose bight, one position with a plane of the ring in line with the axis of the handle in which position it may be used for landing fish and finally one position where the ring is folded to a position alongside the handle in which position it may be easily carried when out of use.

In order that this invention may be easily understood and worked, it will in the following be described with reference to the drawing, illustrating one preferred embodiment.

The different constructional parts of interest which are comprised by the invention will also be described in this connection.

In the drawing,

Fig. 1 illustrates an elevation of the means according to the invention with the landing net in position to be used for the coiling and supporting of the loose bight, the net being shown in dotted lines.

Fig. 2 illustrates the same landing net fixed for landing with the strap, clip and arm removed and the net being shown in dotted lines.

Fig. 3 is a plan view of a part of Fig. 1 showing the frame, ring and net.

The landing net according to Fig. 2 comprises a handle formed in two parts 1 and 2. These two parts are hingedly connected together at 3 and are lockable in the position shown in Fig. 2 by means of a locking nut 4, which easily may be released. The landing net ring 5 is attached to a front piece by means of a screw, whereby the landing net ring easily may be detached if it is desired to substitute for the landing net a landing hook which is used for landing larger fish. The said front piece of the handle is attached to the part 2 by means of a joint 6, which is provided with a locking nut 7, and which is adapted to lock the landing net ring in three positions, namely in the position shown in Fig. 2, adapted when using the landing net for landing fish, and in the position shown in Fig. 1, adapted to be used when the landing net shall serve as supporting means for the loose bight portion of a fishing line, and finally in the position not shown in the drawing, where the landing net ring 5 is folded on to the shaft parts 1 and 2.

In Fig. 1 is illustrated how the landing net according to this invention may be used for supporting and coiling the loose bight portion of a fishing line when fishing. The handle parts 1 and 2 are shown folded together and the landing net ring 5 is locked in the position substantially at 90° angle to the handle parts 1 and 2. The handle parts 1 and 2 are clamped in the holder 14, which again is attached to a belt 8 which may be carried by the person who is doing the fishing.

On the holder 14 an arm 9 is swingably and lockably attached by means of a nut 10 whereby this arm may be locked in any desired position. The arm 9 has an eye 13 and is dimensioned in such a way that the eye 13 may be brought to be located substantially in the center of the landing net ring 5 and in a plane with said ring as shown in the drawing.

When the landing net now is to be used as a supporting frame for the loose bight, the surplus 11 of the landing net bag may be pulled through the eye 13 in such a way that the remainder of the landing net bag will form a ring-shaped gutter 12 around the center of the landing net ring 5. In this gutter the loose bight may be easily coiled and supported ready to run out when the fly is shot.

In the foregoing the invention has been described with reference to an embodiment where a landing net is formed in such a way that it is adapted to be used as a supporting tray or frame for the loose bight.

The invention is however not limited to this construction, as one also may construct the same means for supporting the loose bight without making these means to be used as a landing net. If however a landing net is used for this purpose as shown in the drawing and described, it may very rapidly be released from the holder 14 in order to be used for landing fish. The fisherman for this purpose only needs to catch the handle part 1 and pull the handles loose from the holder 14, whereby the handle 2 will fall out and the case will be the same with the front piece holding the landing bag ring, whereby these elements will lock themselves in the position as shown in Fig. 2.

When the means according to the invention is out of use, this may easily be carried by the fisherman by releasing the locking means between the handle part 2 and the front piece, whereby the landing net ring 5 may be swung down on to the folded handle parts 1 and 2, whereby the whole assembly takes very little place.

I claim:

An attachment for a landing net of the type having a handle with a ring-shaped frame and a net secured thereon, comprising a holder having means to clamp it on said handle and adapted to be secured on a belt, an arm pivotally mounted at one end on the holder and means to secure said arm in a pivotally adjusted position on the holder, said arm having an offset portion terminating in an eye member at the other end thereof, said arm being adjustable to bring the eye member into the plane of the ring-shaped frame of the net so that a portion of the net may be drawn through the eye member to form an annular trough with the remaining part of the net between said eye and frame into which a fishing line may be coiled for casting purposes.

ASBJÖRN HÖRGÅRD.

REFERENCES CITED

The following references are of record in the file of this patent:

UNITED STATES PATENTS

| Number | Name | Date |
| --- | --- | --- |
| 1,657,892 | Muldoon | Jan. 31, 1928 |
| 1,836,593 | Harvey | Dec. 15, 1931 |
| 2,172,175 | Probst | Sept. 5, 1939 |

FOREIGN PATENTS

| Number | Country | Date |
| --- | --- | --- |
| 6,883 | Great Britain | of 1907 |
| 33,751 | Norway | Jan. 2, 1922 |
| 463,492 | Germany | July 30, 1928 |